United States Patent
Ashida et al.

[11] 3,901,590
[45] Aug. 26, 1975

[54] LOOP CONTROL SYSTEM IN MOTION PICTURE PROJECTOR OR THE LIKE

[75] Inventors: Akira Ashida; Kiyoshi Takahashi, both of Tokyo, Japan

[73] Assignee: Canon Kabushiki Kaisha, Tokyo, Japan

[22] Filed: Apr. 24, 1974

[21] Appl. No.: 463,847

[30] Foreign Application Priority Data
Apr. 28, 1973  Japan .............................. 48-48669

[52] U.S. Cl. ..................... 352/14; 226/44; 226/45; 242/183; 250/571
[51] Int. Cl.² ........................................ G03B 31/00
[58] Field of Search .................. 352/14; 226/44, 45; 242/183; 250/571

[56] References Cited
UNITED STATES PATENTS

| | | | |
|---|---|---|---|
| 1,912,892 | 6/1933 | Eitzen | 352/14 X |
| 2,147,467 | 2/1939 | Stephenson | 226/45 X |
| 2,906,584 | 9/1959 | Hammer | 352/14 |
| 3,244,469 | 4/1966 | Hennessey | 352/14 |
| 3,597,056 | 8/1971 | Sasaki | 352/14 |

*Primary Examiner*—Monroe H. Hayes
*Attorney, Agent, or Firm*—Fitzpatrick, Cella, Harper & Scinto

[57] ABSTRACT

This specification discloses a loop control system in a motion picture projector or the like wherein a film loop is formed between a first and a second film feed mechanism. The loop control system includes a film loop amount detecting mechanism responsive to the position of a side edge of the film loop which is variable with the amount of the loop, and a control mechanism for receiving a signal from the film loop amount detecting mechanism to control the film feeding velocity of one of the two film feed mechanisms, whereby maintaining the film loop at a predetermined amount.

28 Claims, 6 Drawing Figures

PATENTED AUG 26 1975

LOOP CONTROL SYSTEM IN MOTION PICTURE PROJECTOR OR THE LIKE

BACKGROUND OF THE INVENTION

1. Field of the Invention

This invention relates to a loop control system in a motion picture projector or the like wherein a film loop is formed between a first and a second film feed mechanism.

2. Description Of The Prior Art

In a motion picture projector, especially a talkie projector, of the type wherein film is drivingly fed with a film loop formed between a first and a second film feed mechanism, the film is intermittently fed to provide stable images on a viewing screen on the one hand and fed at a predetermined speed to provide normal reproduction of sounds on the other hand, and the loop formed between the two feed mechanisms serves to avoid occurence of any mistiming between the feeding speeds of the two feed mechanisms which would adversely affect the film and the feed mechanisms. However, slip or the like of the belt transmitting the drive to the two feed mechanisms may cause mistiming between these mechanisms which may in turn vary the amount of the loop to adversely affect the images and sounds as they are reproduced.

SUMMARY OF THE INVENTION

In view of the above-noted problems, it is a primary object of the present invention to provide a loop control mechanism in a motion picture projector or the like which can automatically detect any variation in the loop amount and also can correct any mistiming between the two film feed mechanisms to ensure a proper loop amount to be maintained at all times.

Other objects of the present invention will become apparent from the following detailed description taken in conjunction with the accompanying drawings.

DESCRIPTION OF THE PREFERRED EMBODIMENTS

Figure 1:
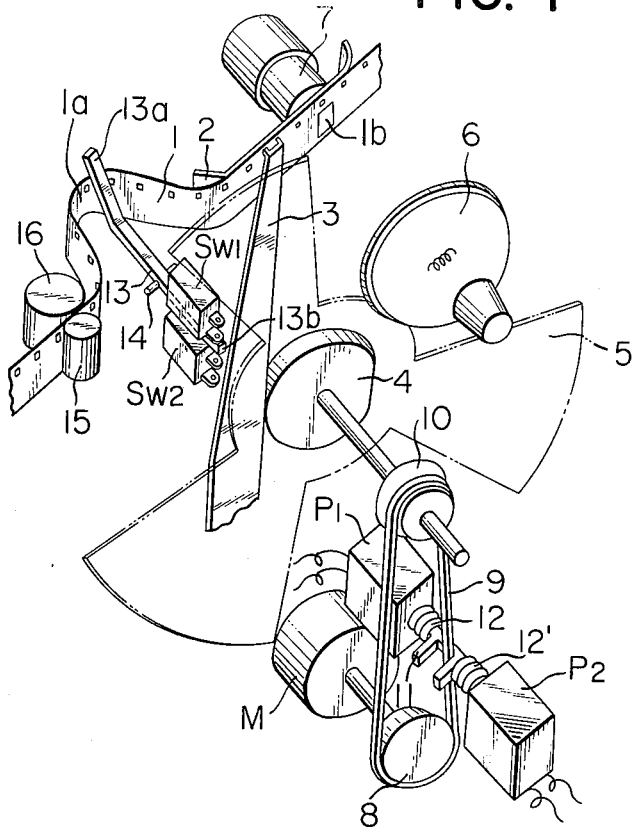
FIG. 1 is a perspective view showing essential portions of a talkie projector provided with a loop control system of the present invention which can automatically detect any variation in the amount of the loop and also can correct any mistiming between the two film feed mechanisms.
Figure 2:
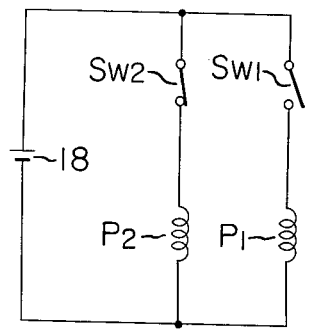
FIG. 2 shows the electrical connections in the control circuit for controlling the loop control system in the talkie projector shown in FIG. 1.

FIG. 1 is a schematic view of the talkie projector provided with a first embodiment of the loop control system according to the present invention which can automatically detect any increase or decrease in the amount of the loop and also can correct any mistiming between the film feed driving mechanisms. FIG. 2 diagrammatically shows the control circuit for controlling the loop control system of the talkie projector shown in FIG. 1.

There is seen a film 1, an apertured plate 2 forming a film gate portion, and a film feed pawl 3 forming a first film feed mechanism for intermittently feeding the film 1 to the film gate portion. The film feed pawl 3 may be driven by a film feed pawl driving cam 4 which is driven from a drive motor M through cone pulleys 8, 10 and belt 9. Each video information recording zone 1b of the film may be projected upon an screen, not shown, through a projection lens 7 when a shutter sector 5 is retracted from the optical path. There are electromagnets P1 and P2 energizable by means to be described, and a belt displacement arm 11 displaceable toward the magnet P1 and P2 upon energization of these magnets. The belt displacement arm 11 is disposed in loose engagement with the belt 9 so that displacement of the arm 11 toward the magnet P1 or P2 causes displacement of the belt 9 in the same direction. Bellows 12 and 12' are provided to maintain the belt displacement arm 11 in its neutral position when both magnets P1 and P2 are in unenergized conditions. A capstan 15 is rotatable by the rotative drive from the motor M, and a pinch roller 16 receives the rotative drive of the capstan 15 with the film 1 nipped therebetween. The capstan 15 and the pinch roller 16 together constitute a second film feed mechanism for feeding the film 1 at a predetermined speed. The film forms a loop portion 1a as it travels between the first and the second film feed mechanisms. A loop amount detecting lever 13 is rotatably supported on a pivot pin 14 secured to the projector body, and comprises a detecting portion 13a normally in engagement with one side edge of the film 1 in the loop portion and a switch controlling portion 13b for closing a switch SW1 upon counter-clockwise rotation of the loop amount detecting lever 13 and for closing a switch SW2 upon clockwise rotation of the detecting lever 13. A power source 18 imparts energization to the electromagnets P1 and P2.

Description will now be made of the operation of first embodiment of the present invention constructed in the above-described manner. Normally, the first and the second film feed mechanism feed the film at an equal speed so that the loop 1a formed between the two film feed mechanisms is maintained at a predetermined loop amount. Whenever the loop is maintained at the predetermined amount, both of the two switches SW1 and SW2 are in open conditions because the switch controlling portion 13b of the loop amount detecting lever 13 with its detecting portion 13a bearing against one side edge of the film 1 in the loop portion 1a is then disposed intermediate of the two switches.

If the balance between the film feeding speed of the first film feed mechanism and that of the second film feed mechanism should be destroyed for some reason or other, the loop amount which has so far been constant will be varied for the increase or the decrease. If the feeding speed of the first film feed mechanism exceeds that of the second film feed mechanism, the loop amount will be increased. An increase in the loop amount causes a counter-clockwise angular displacement of the detecting portion 13a of the loop amount detecting lever 13 which is bearing against the side edge of the film 1 in the loop portion 1a, so that the switch SW1 is closed. Closing of the switch SW1 permits the electromagnet P1 to be energized so as to attract the belt displacement arm 11. As the belt displacement arm 11 is displaced toward the magnet P1, the belt 9 is also displaced toward this magnet until it is engaged with the smaller-diametered portion of the cone pulley 8 to transmit the rotative drive of the motor M to the first film feed mechanism, whereby the film feeding speed of the first film feed mechanism is made slower than that of the second film feed mechanism by the transmission comprising the cone pulleys 8, 10 and belt 9 so that the loop 1a is reduced back to its normal amount. As soon as the loop 1a restores its normal amount, the switch controlling portion 13b of the loop amount detecting lever 13 is brought back to the position intermediate of the switches SW1 and SW2, so that the switch SW1 is opened to deenergize the magnet P1 and thereby permit the belt displacement arm 11 and belt 9 to be returned to their normal positions.

Conversely, if the film feeding speed of the first film feed mechanism is slower than that of the second film feed mechanism, the amount of the loop will be decreased. A decrease in the loop amount causes a clockwise angular displacement of the detecting portion 13a of the loop amount detecting lever 13 which is bearing against the side edge of the film 1 in the loop portion 1a, so that the switch SW2 is closed. Closing of the switch SW2 permits the electromagnet P2 to be energized so as to attract the belt displacement arm 11. The displacement of the belt displacement arm 11 toward the magnet P2 causes the belt 9 to be engaged with the smallerdiametered portion of the cone pulley 10 and the larger-diametered portion of the cone pulley 8, whereby the film feeding speed of the first film feed mechanism becomes higher than that of the second film feed mechanism, in contradistinction to the previous case where the loop amount has been increased, and as a result, the loop 1a is increased to its normal amount. Upon the loop 1a restoring its normal conditions, the switch SW2 is opened to deenergize the magnet P2 and thereby return the belt displacement arm 11 and belt 9 to their normal positions.

Figure 3:
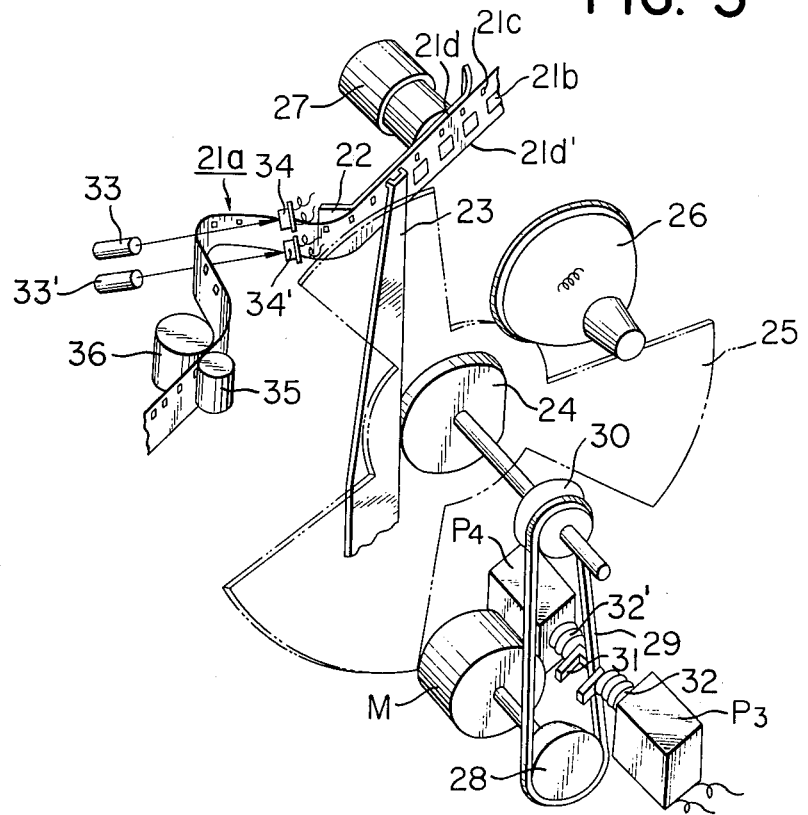
FIG. 3 is a perspective view showing essential portions of a talkie projector provided with a loop control system according to another embodiment of the present invention which can automatically detect any variation in the amount of the loop and also can correct any mistiming between the two film feed mechanisms.
Figure 4:
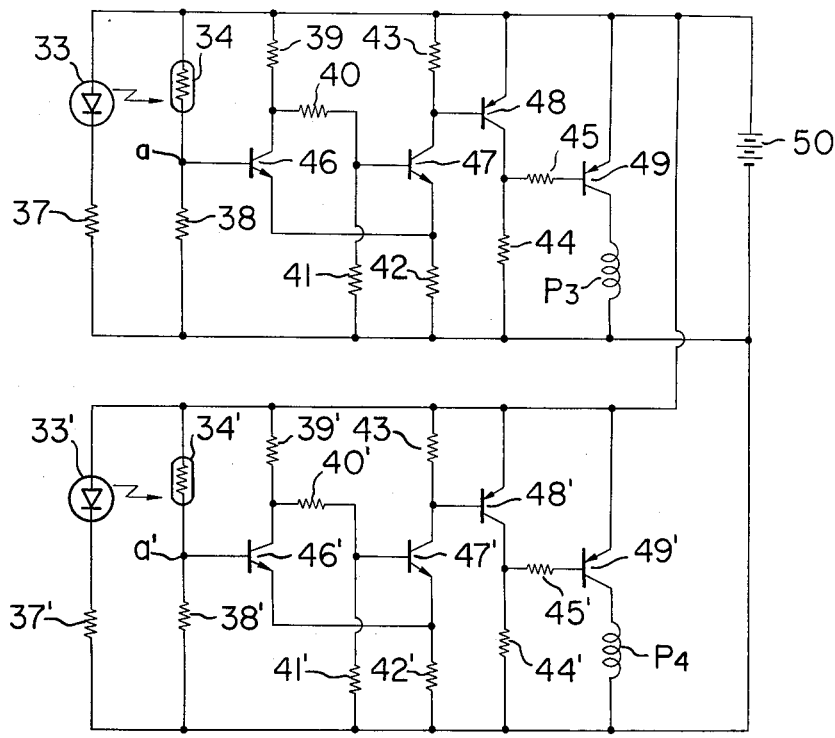
FIG. 4 shows the electrical connections in the control circuit for controlling the loop control system in the talkie projector shown in FIG. 3.
Figure 5:
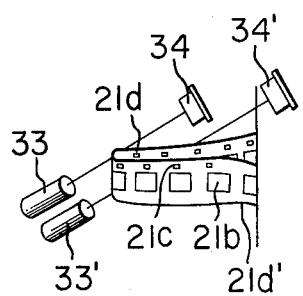
FIG. 5 is an enlarged, detailed, perspective view of the loop amount detecting portion of the loop control system shown in FIG. 3.

FIGS. 3, 4 and 5 show a second embodiment of the loop control system according to the present invention. More particularly, FIG. 3 shows the loop control mechanism, FIG. 4 shows the loop control circuit and FIG. 5 shows the loop detecting portion. As compared with the first embodiment which employs mechanical means to detect the variation in the loop amount from the side edge of the film, the second embodiment is the loop control system which employs optical means to detect the variation in the loop amount.

Referring to FIG. 3, film 21 has video information recording zones 21b, performations 21c and blackened or light-intercepting zones 21d and 21d' provided along the opposite side adges of the film 21 for intercepting the passage of light therethrough. There is seen an apertured plate 22 forming a film gate portion, and a film feed pawl 23 forming a film feed mechanism for intermittently feeding the film 21 to the film gate portion. The film feed pawl 23 may be driven by a film feed pawl driving cam 24 which is, in turn driven by a motor M through cone pulleys 28, 30 and belt 29. Each video information recording zone 21b may be projected upon an unshown screen by a light source 26 through a projection lens 27 when a shutter sector 25 is retracted from the optical path. There are electromagnets P3 and P4 energizable by means to be described, and a belt displacement arm 31 pivotally displaceable in a direction perpendicular to the belt 29 upon energization of these magnets. The belt displacement arm 31 is disposed in loose engagement with the belt 29 so that pivotal displacement of the arm 31 caused by the magnet P3 and P4 causes displacement of the belt 29 in the same direction. Bellows 32 and 32' are provided to maintain the belt displacement arm 31 out of engagement with the belt 29 when the magnets P3 and P4 are in unenergized conditions or are rendered from energized conditions to deenergized conditions. A capstan 35 is rotatable by the rotative drive from the motor M, and a pinch roller 36 receives the rotative drive of the capstan 35 with the film 21 nipped therebetween. The capstan 35 and the roller 36 together constitute a second film feed mechanism for feeding the film at a predetermined speed. The film forms a loop portion 21a as it travels between the first and the second film feed mechanism. There are further provided light-emitting diodes 33, 33' and photoelectric elements 34, 34' (such as Ps) disposed at the positions for receiving the light beams from the light-emitting diodes 33, 33' with the light-intercepting zones 21d, 21d' of the film 21 interposed between the diodes and the photoelectric elements. The opposed relationship between the light-emitting diodes 33, 33' and the photoelectric elements 34, 34' is such that the line passing through each light-emitting diode and associated photoelectric element is inclined with respect to the plane of the loop 21a. When the light-intercepting zones 21d, 21d' are offset with respect to the light beams, the photoelectric elements 34, 34' will supply a higher voltage to the loop control circuit shown in FIG. 4. The circuit includes resistors 37, 37', 38, 38', 39, 39', 40, 40', 41, 41', 42, 42', 43, 43', 44, 44', 45, 45' and transistors 46, 46', 47, 47', 48, 48', 49, 49' and a power source 50. The resistors 39, 39', 40, 40', 41, 41', 42, 42' and the transistors 46, 46', 47, 47' together constitute a Schmidt circuit.

Description will now be made of the operation of the second embodiment of the present invention constructed in the described manner. Normally, the first and the second film feed mechanism feed the film film at an equal velocity so that the loop 21a formed between the two film feed mechanisms is maintained at a predetermined loop amount. Whenever the loop is maintained at the predetermined amount, the light-intercepting zones 21d, 21d' provided along the side edges of the film 21 are disposed in alignment with and between the light-emitting diodes 33, 33' and the photoelectric elements 34, 34' so as to intercept the passage of the light beams from the diodes 33, 33' to the photoelectric elements 34,34', so that there is no voltage produced across the loop control circuit and thus magnets P3 and P4 remain unenergized.

If the balance between the film feeding speed of the first film feed mechanism and that of the second film feed mechanism should be broken for some reason or other, for example, if the former speed becomes slower than the latter speed, then the loop amount will be decreased. With the decrease in the loop amount, the light-intercepting zone 21d of the loop portion 21a which has so far been intercepting the passage of the light from the light-emitting diode 33 to the photoelectric element 34 is displaced toward the photoelectric element to thereby increase the quantity of light impinging from the light-emitting diode 33 upon the photoelectric element 34. As the quantity of light so impinging from the diode 33 on the element 34 is increased, the input terminal potential of the Schmidt circuit becomes higher than a predetermined level due to the division ratio of the photoelectric element 34 and the resistor 38. With the increase in the input terminal potential of the Schmidt circuit, the transistor 46 is rendered from its non-conductive state into its conductive state and the hitherto conductive transistor 47 is momentarily turned off by the cooperation of the resistors 39, 40, 41 and 42, so that the collector potential of the transistor 47 is raised up to a level substantially equal to that of the source potential. Subsequently, the transistor 48 connected to the collector of the transistor 47 is rendered from its conductive state into its non-conductive state to decrease its collector potential down to a level substantially equal to the ground potential. As a result, the transistor 49 connected to the collector of the transistor 48 through the resistor 45 is rendered conductive to energize the magnet P3, which thus attracts the belt displacement arm 31. With such displacement of the belt displacement arm 31 toward the magnet P3, the belt 29 is also displaced toward the same magnet until it is engaged with the smaller-diametered portion of the cone pulley 30 and the larger-diametered portion of the cone pulley 28 to transmit the rotative drive of the motor M to the first film feed mechanism, whereby the film feeding speed of the first film feed mechanism is made faster than that of the second film feed mechanism by the transmission comprising the cone pulleys 28, 30 and belt 29 so that the loop 21a restores its normal conditions. As soon as the loop 21a restores its normal conditions, the light-intercepting zone 21d of the film 21 comes into alignment with and between the light-emitting diode 33 and the photoelectric element 34 to decrease the quantity of light passed from the diode 33 to the element 34, thereby decreasing the potential at the junction a between the photoelectric element 34 and the resistor 38, which junction is also connected to the input terminal of the Schmidt circuit. The potential drop at the junction a causes the Schmidt circuit to restore its normal conditions and renders the transistor 48 conductive while rendering the transistor 49 non-conductive, thus deenergizing the magnet P3 to permit the belt displacement arm 31 and the belt 29 to be urged back to their normal positions by the bellows 32.

Conversely, if the film feeding speed of the first film feed mechanism becomes faster than that of the second film feed mechanism, the amount of the loop will be increased. An increase in the loop amount causes displacement of the light-intercepting zone 21d' of the film toward the light-emitting diode 33', so that when the light beam from the light-emitting diode 33' impinges upon the photoelectric element 34' the input terminal potential of the Schmidt circuit exceeds a predetermined level due to the division ratio of the photoelectric element 34' and the resistor 38', as in the case where the loop amount has been decreased. Such increase in the input terminal potential of the Schmidt circuit turns on the transistor 46' which has so far been non-conductive, and the hitherto conductive transistor 46' is momentarily rendered non-conductive by the cooperation of the resistors 39', 40', 41' and 42' so that the collector potential of the transistor 47' is increased up to a level substantially equal to that of the source potential. The transistor 48' connected to the collector of the transistor 47' is rendered from its conductive state into its non-conductive state and the collector potential thereof is decreased down to a level substantially equal to the ground potential. As a result, the transistor 49' connected to the collector of the transistor 48' through the resistor 45' is turned on to energize the magnet P4, which thus attracts the belt displacement arm 31. With the displacement of the belt displacement arm 31 toward the same magnet P4, the belt 29 is also displaced toward the same magnet until it is engaged with the smaller-diametered portion of the cone pulley 28 and the larger-diametered portion of the cone pulley 30 to transmit the rotative drive of the motor M to the first film feed mechanism, whereby the film feeding speed of the first film feed mechanism is made slower than that of the second film feed mechanism by the transmission comprising the cone pulleys 28, 30 and belt 29; and thus the loop 21a restores its normal conditions. When the loop 21a has so restored its normal conditions, the light-intercepting zone 21d'to of the film 21 comes into alignment with and between the light-emitting diode 33' and the photoelectric element 34' to intercept the passage of the light from the diode 33' to the element 34' and thereby decrease the potential at the junction a' between the photoelectric element 34' and the resistor 38', thus permitting the Schmidt circuit to restore its normal conditions and also rendering the transistor 48' conductive while rendering the transistor 49' non-conductive to deenergize the magnet P4. Thus, the belt displacement arm 31 and the belt 29 are urged back to their normal positions by the bellows 32'.

Figure 6:
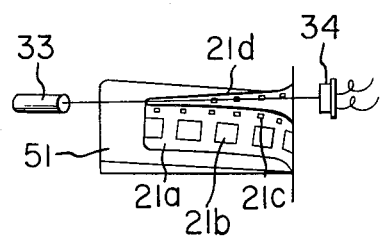
FIG. 6 is a perspective view showing a modification of the loop amount detecting portion of the loop control system shown in FIG. 3.

FIG. 6 shows a modification of the loop amount detecting portion of the loop control means shown in FIG. 5. The loop amount detecting portion of FIG. 5 is designed such that the optical device comprising diodes 33, 33' and light-receiving elements 34, 34' is inclined with respect to the plane of the film, whereas the modification shown in FIG. 6 is of such a design that the optical device is normally disposed at right angles with the plane of the film 21 but the loop portion 21a of the film is inclined by a support member 51. In this embodiment, unlike the embodiments of FIGS. 1 and 3 wherein the film feeding speed of the first film feed mechanism and that of the second film feed mechanism are made equal to maintain a predetermined amount of film loop, the two film feeding speeds are purposely made different, i.e. one faster than the other, to thereby gradually increase or decrease the loop amount and at a point of time whereat the loop amount is greater or smaller than the predetermined level, one of the two film feed mechanisms is controlled and by the repetition of such operation the loop may be maintained at the predetermined amount.

Thus the present invention enables the increase or decrease in loop amount to be automatically detected by either side edge of the film and can also correct the mistiming between the feeding speeds of the film feed mechanisms to ensure a proper loop element to be maintained at all times, thereby contributing to good reproduction of images and sounds.

We claim:

1. A device for feeding strip material with a predetermined amount of loop being formed therewith, while said strip material is moving along a travelling path therefor, which comprises in combination:
   a. means for transferring said strip material, the amount of the loop formed with said strip material being varied in accordance with the change in the operating speed of said transfer means;
   b. means for detecting positional displacement of the edge of said strip material corresponding to the variation in the loop amount at the topmost part thereof, said detecting means being disposed in such a manner that the operational direction of said means with respect to the edge of said strip material is inclined with respect to the direction of variation in said loop amount so as to obtain the variation in said loop amount in terms of the positional displacement of the edge of said strip material, and a signal output being generated whenever said loop amount deviates from a predetermined amount; and
   c. means for controlling the transfer speed of said strip material which is operatively connected to said transfer means and is capable of responding to said signal output from said detection means, said control means operating to control the operating speed of said transfer means in a manner to cause said loop amount in said strip material to be a predetermined amount in accordance with said signal from said control means.

2. The device as claimed in claim 1, wherein said strip material transfer means (a) comprises: a first transfer mechanism to intermittently move said strip material forward; a second transfer mechanism to continuously transfer said strip material intermittently moved by said first transfer mechanism at a constant speed; and a driving power source to drive both said first and said second transfer mechanisms,
   said loop being formed in a position between said first transfer mechanism and said second transfer mechanisms, said strip material transfer speed control means being provided in a power transmission path extending from said driving power source to said first transfer mechanism, and the operating speed of said first transfer mechanism being controlled by said speed control means.

3. The device as claimed in claim 2, wherein said detection means (b) comprises: a first signal generating means which generates a signal when said loop amount exceeds said predetermined amount; and a second signal generating means which generates a signal when said loop amount decreases below said predetermined amount,
   said strip material transfer speed control means being responsive to each of the signals generated from said first and second signal generating means, thereby reducing the operating speed of said first transfer mechanism in accordance with the signal generated from said first signal generating means, and increasing the operating speed of said first transfer means in accordance with the signal generated from said second signal generating means.

4. The device as claimed in claim 3, wherein said strip material transfer speed control means (c) includes: a speed changing mechanism provided in a power transmission path extending from said driving power source to said first transfer mechanism, to change the operating speed of said transfer mechanism; and a speed setting means which is operatively connected to said speed changing mechanism, and is capable of responding to each of the signals generated from said first and said second signal generating means, said speed setting means establishing in said speed changing mechanism an operating speed for said first transfer mechanism so as to cause said loop amount to reduce in accordance with the signal generated from said first signal generating means, and also establishing another operating speed for said first transfer mechanism so as to cause said loop amount to increase in accordance with the signal generated from said second signal generating means.

5. The device as claimed in claim 1, wherein said detecting means comprises: a detection lever which contacts an edge of said strip material at the topmost part of said loop from a direction inclined with respect to the direction of variation in said loop amount to detect any variation in said loop amount in terms of the positional displacement of the edge of said strip material; a first switching member operatively connected to said detection lever and being actuated when the loop amount detected by said detection lever exceeds said predetermined amount; and a second switching member operatively connected to said detection lever and being actuated when the loop amount detected by said detection lever decreases below said predetermined amount,
   said strip material transfer speed control means being electrically connected to said first and said second switching members, and controlling the operating speed of said transfer means in accordance with the operational conditions of said first and said second switching members.

6. The device as claimed in claim 5, wherein said strip material transfer speed control means comprises: a speed changing mechanism operatively connected to said transfer means to change the operating speed of said tranfer means, a first speed setting means operatively connected to said speed changing mechanism as well as being electrically connected to said first switching member, for establishing in said speed changing mechanism an operating speed for said transfer means so as to reduce said loop amount when said first switching member is actuated; and a second speed setting means operatively connected to said speed changing mechanism as well as being electrically connected to said second switching member, for establishing in said speed changing mechanism an operating speed for said transfer means so as to increase said loop amount when said second switching member is actuated.

7. The device as claimed in claim 1, wherein said detecting means comprises:
   a first light flux projecting means to project light flux toward one of the edges of said strip material at the topmost part of said loop from a direction inclined with respect to the changing direction of said loop amount;
   a first light receiving means disposed in such a manner that the light flux from said first light flux projecting means is received thereinto at the back-side of said edge part within the light path for said first light flux projecting means, only when the amount of said loop exceeds the predetermined amount, said first light receiving means generating an electrical signal output when it receives said light flux from said first light flux projecting means;

a second light flux projecting means to project light flux toward the other edge of said strip material at the topmost part of said loop from a direction inclined with respect to the changing direction of said loop amount; and a second light receiving means disposed in such a manner that the light flux from said second light flux projecting means is received thereinto at the backside of said edge part within the light path for said second light flux projecting means, said second light receiving means generating an electrical signal output when it receives said light flux from said second light flux projecting means, said strip material transfer speed control means being electrically connected to said first and second light receiving means for controlling the operating speed of said transfer means in accordance with the electrical signal outputs produced from said first and second light receiving means.

8. The device as claimed in claim 7, wherein said strip material transfer speed control means comprises: a speed changing mechanism operatively connected to said transfer means, for changing the operating speed of said transfer means; a first speed setting means operatively connected to said speed changing mechanism for establishing in said speed changing mechanism an operating speed for said transfer means so as to cause said loop amount to decrease in response to the signal output produced from said first light receiving means; and a second speed setting means operatively connected to said speed changing mechanism for establishing in said speed changing means an operating speed for said transfer means so as to cause said loop amount to increase in response to the signal output produced from said second light receiving means.

9. A device for feeding strip material with a predetermined amount of loop being formed therewith, while said strip material is moving along a travelling path therefor, which comprises in combination:

first and second strip material transfer means to cause said strip material to run, a loop in said strip material being formed at a position between said first transfer means and said second transfer means, the amount of said loop being varied in accordance with the difference in the strip material transfer speed between said first transfer means and said second transfer means;

a loop amount detecting means to detect a positional displacement in one of the edges of said strip material at the topmost part of said loop corresponding to variations in the loop amount, said detecting means acting on one of the edges of said strip material in a direction inclined with respect to a locus of movement of the topmost part of said loop within a plane containing therein the locus of movement of the topmost part of said loop following the variations in said loop amount and a cross-section of said strip material at the topmost part of said loop, said detecting means finding the variations in said loop amount in terms of the positional displacement of the edge of said strip material, on the basis of which it produces a signal output when said loop amount deviates from the predetermined amount; and a strip material transfer speed control means operatively connected to said first transfer means capable of responding to said signal output produced from said loop amount detecting means as an output, and for controlling the strip material transfer speed of said first transfer means in such a manner that said loop amount attains a predetermined amount in accordance with said signal produced from said loop amount detecting means.

10. The device as claimed in claim 9, further comprising: an electrically operated driving power source to drive said first and said second transfer means, said power source being operatively connected to said second transfer means and said strip material transfer speed control means.

11. The device as claimed in claim 10, wherein said strip material transfer speed control means comprises: a speed changing mechanism provided in a power transmission path extending from said driving power source to said first transfer means to change the operating speed of said first transfer means; and a speed setting means which is operatively connected to said speed changing mechanism and is capable of responding to an electrical signal output produced from said loop amount detecting means, said speed setting means establishing in said speed changing mechanism an operating speed for said first transfer means so as to bring said loop amount to a predetermined amount in accordance with the signal output produced from said loop amount detecting means.

12. The device as claimed in claim 11, wherein said speed changing mechanism comprises: a first conical pulley connected to said driving power source; a second conical pulley connected to said first transfer means; a belt member stretched between said first and second pulleys; and a speed ratio selecting means operatively associated with said belt member.

13. The device as claimed in claim 11, wherein said loop amount detecting means comprises: a first signal generating means to produce an electrical signal output when said loop amount exceeds said predetermined amount; and a second signal generating means to produce an electrical signal output when said loop amount decreases below said predetermined amount, said speed setting means being capable of responding to the signal outputs from both said first and said second signal generating means.

14. The device as claimed in claim 13, wherein said speed setting means comprises: a first electromagnetic means operatively connected to said speed changing mechanism as well as electrically connected to said first signal generating means to establish in said speed changing mechanism such an operating speed for said first transfer means as to cause said loop amount to reduce in accordance with a signal output produced by said signal generating means; and a second electromagnetic means also operatively connected to said speed changing mechanism as well as electrically connected to said second signal generating means to establish in said speed changing mechanism an operating speed for said first transfer means so as to cause said loop amount to increase in accordance with a signal output produced by said signal generating means.

15. The device as claimed in claim 9, wherein said loop amount detection means comprises: a detection lever which detects variations in said loop amount in terms of a positional displacement of the edge of said strip material by contacting one of the edges of said strip material from a direction inclined with respect to a locus of movement of the topmost part of said loop within a plane containing therein the locus of movement of the topmost part of said loop following the change in said loop amount, and a cross-section of said strip material at the topmost part of said loop, a first switching member operatively connected to said detection lever being actuated when the loop amount detected by said detection lever exceeds said predetermined amount; a second switching member operatively connected to said detection lever and being actuated when the amount of loop detected by said detection lever decreases below said predetermined amount, said strip material transfer speed control means being electrically connected to said first and said second switching members for controlling the operating speed of said first transfer means in accordance with the operational condition of said first and said second switching members.

16. The device as claimed in claim 15, wherein said strip material transfer speed control means comprises: a speed changing mechanism operatively connected to said first transfer means to change the operating speed of said first transfer means; a first speed setting means operatively connected to said speed changing means to establish in said speed changing means an operating speed for said first transfer means so as to cause said loop amount to decrease when said first switch member is actuated; and a second speed setting means operatively connected to said speed changing mechanism to establish in said speed changing mechanism an operating speed for said first transfer means so as to cause said loop amount to increase when said second switch member is actuated.

17. The device as claimed in claim 9, wherein said loop amount detection means includes an optical detection means to detect the variations in the loop amount in terms of a positional displacement of the edge part of said strip material at the topmost part of said loop, said optical detection means comprising: a light flux projecting means to project light onto the edge of said strip material from a direction inclined with respect to the locus of movement of the topmost part of said loop within a plane containing the locus of movement of the topmost part of said loop following the change in said loop amount and a cross-section of said strip material in said topmost part of the loop; and a light receiving means disposed in such a manner that the light flux may be received at the back-side of the edge of said strip material in the light flux path of said light flux projecting means, only when said loop amount deviates from said predetermined amount, said light receiving means producing an electrical signal output at the time of its receipt of the light flux, and said strip material transfer speed control means being capable of responding to the electrical signal output produced from said light receiving means for controlling the operating speed of said first transfer means.

18. The device as claimed in claim 17, wherein said loop amount detecting means further comprises a switching means electrically connected to said light receiving means, and being actuated by the electrical signal output from said light receiving means, said strip material transfer speed control means being electrically connected to said switching means and controlling the operating speed of said first transfer means in accordance with the switching operation of said switching means.

19. The device as claimed in claim 18, wherein said strip material transfer speed control means comprises: a speed changing mechanism operatively connected to said first transfer means to change the operating speed of said first transfer means; and a speed setting means operatively connected to said speed changing mechanism to establish in said speed changing mechanism an operating speed for said first transfer means so as to cause said loop amount to be in a predetermined amount in accordance with the switching operation of said switching means.

20. The device as claimed in claim 17, further comprising means to support said strip material at the loop portion thereof, said supporting means having a plane inclined with respect to the horizontal plane, and said loop portion of said strip material being so supported that the locus of movement of said topmost part of said loop is inclined with respect to said horizontal plane.

21. The device as claimed in claim 20, wherein said light flux projecting means is so disposed that the light flux path therefor is in parallel with said horizontal plane.

22. The device as claimed in claim 9, wherein said loop amount detecting means includes:

a first optical detecting means to detect variations in the loop amount at the topmost part of said loop in terms of a positional displacement of the edge part of said strip material, which comprises: a first light flux projecting means to project light flux onto one of the edge parts of said strip material from a direction inclined with respect to a locus of movement of the topmost part of said loop within a plane containing the locus of movement of the topmost part of said loop following the variations in said loop amount and a cross-section of said strip material at the topmost part of said loop; and a first light receiving means disposed in such a manner that the light flux from said first light flux projecting means can be received at the back-side of said edge part of said strip material within the light path of said first light flux projecting means, only when said loop amount exceeds said predetermined amount, said light receiving means producing an electrical signal output when it receives said light flux; and a second optical detecting means to detect variations in said loop amount at the topmost part of said loop in terms of a positional displacement of the edge part of said strip material, which comprises: a second light flux projecting means to project light flux onto the other edge part of said strip material from a direction inclined with respect to a locus of movement of the topmost part of said loop within a plane containing the locus of movement of the topmost part of said loop following the variations in said loop amount and a cross-section of said strip material at the topmost part of said loop; and a second light receiving means disposed in such a manner that the light flux from said second light flux projecting means can be received at the backside of said edge part of said strip material within the light path of said second light flux projecting means, only when said loop amount decreases below said predetermined amount, said strip material transfer speed control means controlling the operating speed of said first transfer means in accordance with the electrical signal output produced from said first and said second light receiving means.

23. The device as claimed in claim 22, wherein said loop amount detecting means further includes: a first switching means electrically connected to said first light receiving means and actuated by an electrical signal output produced from said first light receiving means; and a second switching means electrically connected to said second light receiving means and actuated by an electrical signal output produced from said second light receiving means, said strip material transfer speed control means being electrically connected to said first and said second switching means, and controlling the operating speed of said first transfer means in accordance with the switching operations of both of said switching means.

24. The device as claimed in claim 23, wherein said strip material transfer speed control means includes: a speed changing mechanism operatively connected to said first transfer means to change the operating speed of said first transfer means; a first speed setting means operatively connected to said speed changing mechanism as well as electrically connected to said first switching means to establish in said speed changing mechanism an operating speed for said first transfer means so as to cause said loop amount to reduce in accordance with the switching operation of said first switching means; and a second speed setting means operatively connected to said speed changing mechanism as well as electrically connected to said second switching means to establish in said speed changing mechanism an operating speed for said first transfer means so as to cause said loop amount to increase in accordance with the switching operation of said second switching means.

25. A motion picture projector of a type, wherein film feeding is carried out with a predetermined amount of a loop being formed therewith, while said film is moving along a travelling path therefore, which comprises:

a display station for displaying image information recorded on said film, said display station being provided with a light source and an optical system for image projection, and the image information recorded on said film being displayed by said light source and optical system at the time of its passage through said display station;

a first film transfer means to intermittently forward said film in said display station with a loop being formed with said film;

a second film transfer means to cause said film so intermittently forwarded by said first film transfer means to continuously travel at a constant speed with the loop formed with said film, said film loop being formed between said first and second film transfer means;

a driving power source to drive said first and said second film transfer means;

a loop amount detecting means to detect a positional displacement in the edge part of said film corresponding to the variations in the loop amount at the topmost part thereof, which comprises: a detection member contacting said film edge in a direction inclined with respect to a locus of movement of the topmost part of said loop within a plane containing the locus of movement of the topmost part of said loop following the variations in said loop amount and a cross-section of said film at the topmost part of said loop, and finding the variations in said loop amount in terms of the positional displacement in said film edge; and a signal generating member to generate a signal when said loop amount detected by said detecting member deviates from said predetermined amount range; and means to adjust the amount of transfer of said film provided in said driving power transmission path extending from said driving power source to said first film transfer means, and to adjust the amount of film transfer of said first film transfer means in such a manner that said loop amount may return to said predetermined amount range in accordance with the signal generated from said signal generating member.

26. A motion picture projector of a type, wherein a film feeding is carried out with a predetermined amount of loop being formed therewith, while said film is moving along a travelling path therefor, which comprises:

a display station for displaying an image information recorded on said film, said display station being provided with a light source and an optical system for image projection, and the image information recorded on said film being displayed by said light source and optical system at the time of its passage through said display station;

a first film transfer means to intermittently forward said film in said display station, while maintaining a loop with said film;

a second film transfer means to cause said film so intermittently forwarded by said first film transfer means to continuously travel at a constant speed, while maintaining the loop with said film, said film loop being formed between said first and second film transfer means;

a driving power source to drive said first and said second film transfer means;

a light intercepting zone formed at the edge part of said film;

a loop amount detecting means to detect a positional displacement of the edge part of said film corresponding to the variations in the loop amount at the topmost part of said loop, which comprises: a light flux generating means which emit light flux to said light intercepting zone in said film edge from a direction inclined with respect to a locus of movement of the topmost part of said loop within a plane containing the locus of movement of the topmost part of said loop following the variations in said loop amount and a cross-section of said film at the topmost part of said loop; and a light receiving means disposed at the back-side of said light intercepting zone of said film edge part in the light path of said light flux generating means, said light receiving means producing a signal output when said loop amount deviates from said predetermined amount range released from interception of light flux by means of said light intercepting zone; and means to adjust the transfer amount of said film provided in said driving power transmission path extending from said driving power source to said first film transfer means and to adjust the film transfer amount of said first film transfer means in such a manner that said loop amount returns to said predetermined amount range and said light flux incident on said light receiving means may be intercepted by said light intercepting zone in accordance with the signal output produced from said light receiving means.

27. A motion picture projector of a type, wherein film feeding is carried out with a predetermined amount of a loop being formed therewith, while said film is moving along a travelling path therefor, which comprises:

a first film transfer mechanism to intermittently forward said film, while maintaining a loop with said film;

a second film transfer mechanism to cause said film so intermittently forwarded by said first film transfer mechanism to continuously travel at a constant speed, while maintaining the loop with said film, said film loop being formed between said first and second film transfer mechanisms;

a speed changing mechanism operatively connected to said first film transfer mechanism to change the operating speed of said first film transfer mechanism, and to cause the loop amount to increase or decrease by varying the film transfer amount of said film transfer mechanism by causing the operating speed of said film transfer mechanism to change;

a driving power source operatively connected to said second film transfer mechanism and said speed changing mechanism to drive said first and said second film transfer mechanisms;

a loop amount detecting means to detect the positional displacement of the edge part of said film corresponding to the variations in the loop amount at the topmost part of said loop, which comprises: a detection member contacting said film edge in a direction inclined with respect to the locus of movement of the topmost part of said loop within a plane containing the locus of movement of the topmost part of said loop following the variations in said loop amount and a cross-section of said film at the topmost part of said loop, and finding out the variations in said loop amount in terms of the positional displacement of said film edge; and a switching member operatively connected to said detection member actuated when the loop amount detected by said detection member deviates from the predetermined amount range; and a speed setting means operatively connected to said speed changing mechanism and its operation controlled by switching member, said speed setting means establishing in said speed changing mechanism an operating speed for said first film transfer mechanism so as to cause said loop amount to return to said predetermined amount range in accordance with the operating conditions of said switching member.

28. A motion picture projector of a type, wherein film feeding is carried out with a predetermined amount of a loop being formed therewith, while said film is moving along a travelling path therefore, which comprises:

a first film transfer mechanism to intermittently forward said film, while maintaining a loop with said film;

a second film transfer mechanism to cause said film so intermittently forwarded by said first film transfer mechanism to continuously travel at a constant speed, while maintaining the loop with said film, said film loop being formed between said first and second film transfer mechanisms;

a speed changing mechanism operatively connected to said first film transfer mechanism to change the operating speed of said first film transfer mechanism, and to cause the loop amount to increase or decrease by varying the film transfer amount of said film transfer mechanism by causing the operating speed of said film transfer mechanism to change;

a driving power source, operatively connected to said second film transfer mechanism and said speed changing mechanism, to drive said first and said second film transfer mechanisms;

a loop amount detecting means to detect a positional displacement in the edge part of said film corresponding to the variations in the loop amount at the topmost part of said loop, which comprises: light flux projecting means to project light flux onto said film edge part from a direction inclined with respect to a locus of movement of the topmost part of said loop within a plane containing the locus of movement of the topmost part of said loop following the variations in said loop amount and a cross-section of said film at the topmost part of said loop; a light receiving means disposed in such a manner that light flux from said light flux projecting means may be received at the backside of said film edge in the light flux path of said light flux projecting means, only when said loop amount deviates from the predetermined amount range, said light receiving means generating an electrical signal at the time of its receipt thereinto of the light flux; and switching means electrically connected to said light receiving means being actuated by the electrical signal output produced from said light receiving means; and a speed setting means operatively connected to said speed changing mechanism and its operation being controlled by said switching means, said speed setting means establishing in said speed changing mechanism an operating speed for said first film transfer mechanism so as to cause said loop amount to return to said predetermined amount range in accordance with the operating conditions of said switching means.

* * * * *

UNITED STATES PATENT OFFICE
CERTIFICATE OF CORRECTION

Patent No. 3,901,590          Dated August 26, 1975

Inventor(s) AKIRA ASHIDA and KIYOSHI TAKAHASHI

It is certified that error appears in the above-identified patent and that said Letters Patent are hereby corrected as shown below:

Column 1, lines 19 and 20, "occurence" should read --occurrence--;

Column 2, line 19, "an screen" should read --a screen--;

Column 3, line 60, "performations" should read --perforations--;

Column 3, line 62, "adges" should read --edges--;

Column 4, line 49, "film film" should read --film--;

Column 6, line 27, "to of" should read --of--;

Column 6, line 66, "loop element" should read --loop amount--;

Column 7, line 42, "mechanisms" should read --mechanism--;

Column 15, line 53, "switching" should read --said switching--;

Signed and Sealed this thirteenth Day of January 1976

[SEAL]

Attest:

RUTH C. MASON
*Attesting Officer*

C. MARSHALL DANN
*Commissioner of Patents and Trademarks*